United States Patent
Inagaki (10) Patent No.: US 10,209,945 B2
(45) Date of Patent: Feb. 19, 2019

(54) INFORMATION PROCESSING APPARATUS CAPABLE OF QUICKLY UPDATING A DISPLAY IN ACCORDANCE WITH AN OPERATION FOR CHANGING A DISPLAY APPEARANCE AND CONTROL METHOD THEREOF

(71) Applicant: CANON KABUSHIKI KAISHA, Tokyo (JP)

(72) Inventor: Kensuke Inagaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/603,696

(22) Filed: May 24, 2017

(65) Prior Publication Data
US 2017/0255443 A1    Sep. 7, 2017

Related U.S. Application Data

(63) Continuation of application No. 14/745,680, filed on Jun. 22, 2015, now Pat. No. 9,690,537.

(30) Foreign Application Priority Data

Jun. 23, 2014    (JP) .................................. 2014-128463

(51) Int. Cl.
*G06F 3/14*    (2006.01)
*H04N 9/31*    (2006.01)
(Continued)

(52) U.S. Cl.
CPC .......... *G06F 3/1454* (2013.01); *G06F 3/0416* (2013.01); *G06F 3/0485* (2013.01); *G06F 3/04845* (2013.01); *G06F 3/04883* (2013.01); *G06F 3/1462* (2013.01); *G09G 5/34* (2013.01); *H04N 9/31* (2013.01); *H04N 9/3188* (2013.01); *G03B 21/00* (2013.01);
(Continued)

(58) Field of Classification Search
None
See application file for complete search history.

(56) References Cited

U.S. PATENT DOCUMENTS

2012/0038678 A1    2/2012    Hwang et al.

FOREIGN PATENT DOCUMENTS

JP    2010-122275 A    6/2010

OTHER PUBLICATIONS

Japanese Office Action, which is enclosed without an English Translation, that issued in Japanese Patent Application No. 2014128463.

*Primary Examiner* — Vu Nguyen
(74) *Attorney, Agent, or Firm* — Cowan, Liebowitz & Latman, P.C.

(57) ABSTRACT

An information processing apparatus that transmits image data to be displayed in a display unit to a display control apparatus and comprises a capture unit configured to capture the image data to be displayed, a transmission control unit configured to perform control such that the captured image data is transmitted to the display control apparatus, and a detection unit configured to detect an operation performed on the information processing apparatus. In a case where the detection unit detects a predetermined operation for changing a display appearance of the image data to be displayed, the transmission control unit performs control such that information of an amount of change resulting from the predetermined operation is transmitted to the display control apparatus.

15 Claims, 10 Drawing Sheets

(51) Int. Cl.
*G06F 3/041* (2006.01)
*G06F 3/0485* (2013.01)
*G06F 3/0484* (2013.01)
*G06F 3/0488* (2013.01)
*G09G 5/34* (2006.01)
G03B 21/00 (2006.01)
(52) U.S. Cl.
CPC ............... *G03B 2206/00* (2013.01); *G06F 2203/04806* (2013.01); *G09G 2340/045* (2013.01)

INFORMATION PROCESSING APPARATUS CAPABLE OF QUICKLY UPDATING A DISPLAY IN ACCORDANCE WITH AN OPERATION FOR CHANGING A DISPLAY APPEARANCE AND CONTROL METHOD THEREOF

CROSS-REFERENCE TO RELATED APPLICATION

This application is a continuation of application Ser. No. 14/745,680, filed Jun. 22, 2015, the entire disclosure of which is hereby incorporated by reference.

BACKGROUND OF THE INVENTION

Field of the Invention

The present invention relates to a system for transferring an image to be displayed by an information processing apparatus to a display control apparatus.

Description of the Related Art

Recent years have seen the spread of systems in which an image to be displayed by an information processing apparatus such as a smartphone or a tablet terminal is transferred to a display control apparatus such as a projector via a communication network such as a wireless LAN, and a screen that is the same as that of the information processing apparatus is displayed by the display control apparatus. With such a system, it is desirable that when a user performs operations such as scrolling, enlargement, and reduction using the information processing apparatus, the screen on which the operations such as scrolling, enlargement, and reduction are performed is also displayed similarly on the display control apparatus so that the user can understand how the display screen will transition. However, doing so increases the data transfer amount, and thus it is difficult for the screen that is to be displayed during operations on the information processing apparatus to be transferred to and displayed on the display control apparatus every time the operation is performed.

With respect to such issues, Japanese Patent Laid-Open No. 2009-10948 proposes a technique in which the entire page of a file is divided into units of scroll width and data stored in a cache memory is used per unit during scrolling to update displaying on the display control apparatus.

However, with the technique described in Japanese Patent Laid-Open No. 2009-10948, cache data is processed in units of scroll width, and thus it is difficult for this technique to handle fine scrolling in a vertical direction or a horizontal direction. Also, this technique cannot handle enlargement and reduction of an image.

SUMMARY OF THE INVENTION

The present invention has been made in consideration of the aforementioned problems, and realizes a technique in which a display control apparatus can update a display in a short time period in accordance with an operation performed in an information processing apparatus, enabling a user to understand how the display screen will transition accordance with operations.

In order to solve the aforementioned problems, the present invention provides an information processing apparatus that transmits image data to be displayed in a display unit to a display control apparatus, the information processing apparatus comprising: a capture unit configured to capture the image data to be displayed; a transmission control unit configured to perform control such that the captured image data is transmitted to the display control apparatus; and a detection unit configured to detect an operation performed on the information processing apparatus, wherein in a case where the detection unit detects a predetermined operation for changing display appearance of the image data to be displayed, the transmission control unit performs control such that information of an amount of change resulting from the predetermined operation is transmitted to the display control apparatus.

In order to solve the aforementioned problems, the present invention provides a control method of an information processing apparatus that transmits image data to be displayed in a display unit to a display control apparatus, the control method comprising: a step of capturing the image data to be displayed; a step of performing control such that the captured image data is transmitted to the display control apparatus; and a step of detecting an operation performed on the information processing apparatus, wherein in a case where a predetermined operation for changing a display appearance of the image data to be displayed is detected in the detection step, control is performed such that information of an amount of change resulting from the predetermined operation is transmitted to the display control apparatus.

According to the present invention, it is possible to update a display on the display control apparatus in a short time period in accordance with the operation performed in the information processing apparatus, and enable a user to understand how the display screen will transition in accordance with operations.

Further features of the present invention will become apparent from the following description of exemplary embodiments with reference to the attached drawings.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Hereinafter, a system will be described in which a smartphone is adopted as an information processing apparatus according to the present invention, a projector is adopted as a display control apparatus, and these devices form a communication network over a wireless LAN. Although a smartphone, which is one type of mobile phone, is assumed as the information processing apparatus in the present embodiment, it should be noted that the present invention can be applied in other mobile electronic devices such as camera-mounted mobile phones and tablet terminals.

System Configuration

Figure 1:
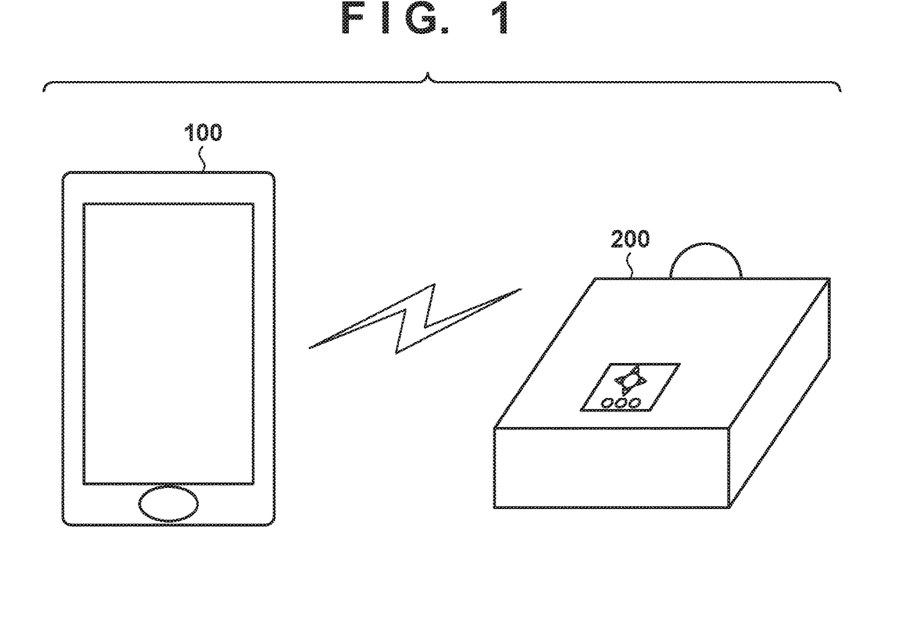
FIG. 1 is a diagram of a system configuration according to an embodiment.

As indicated in FIG. 1, which illustrates a system configuration according to the present embodiment, a smartphone 100 can capture video that is being displayed on a display thereof and transmit the captured video as video data to a projector 200 connected to a communication network. Meanwhile, the projector 200 can receive the video data from the smartphone 100 and project the received data on a screen or the like.

Apparatus Configuration

The configurations and functions of the smartphone 100 and the projector 200 of the embodiment according to the present invention will be described with reference to the schematic illustrations with reference to FIG. 2.

Figure 2:
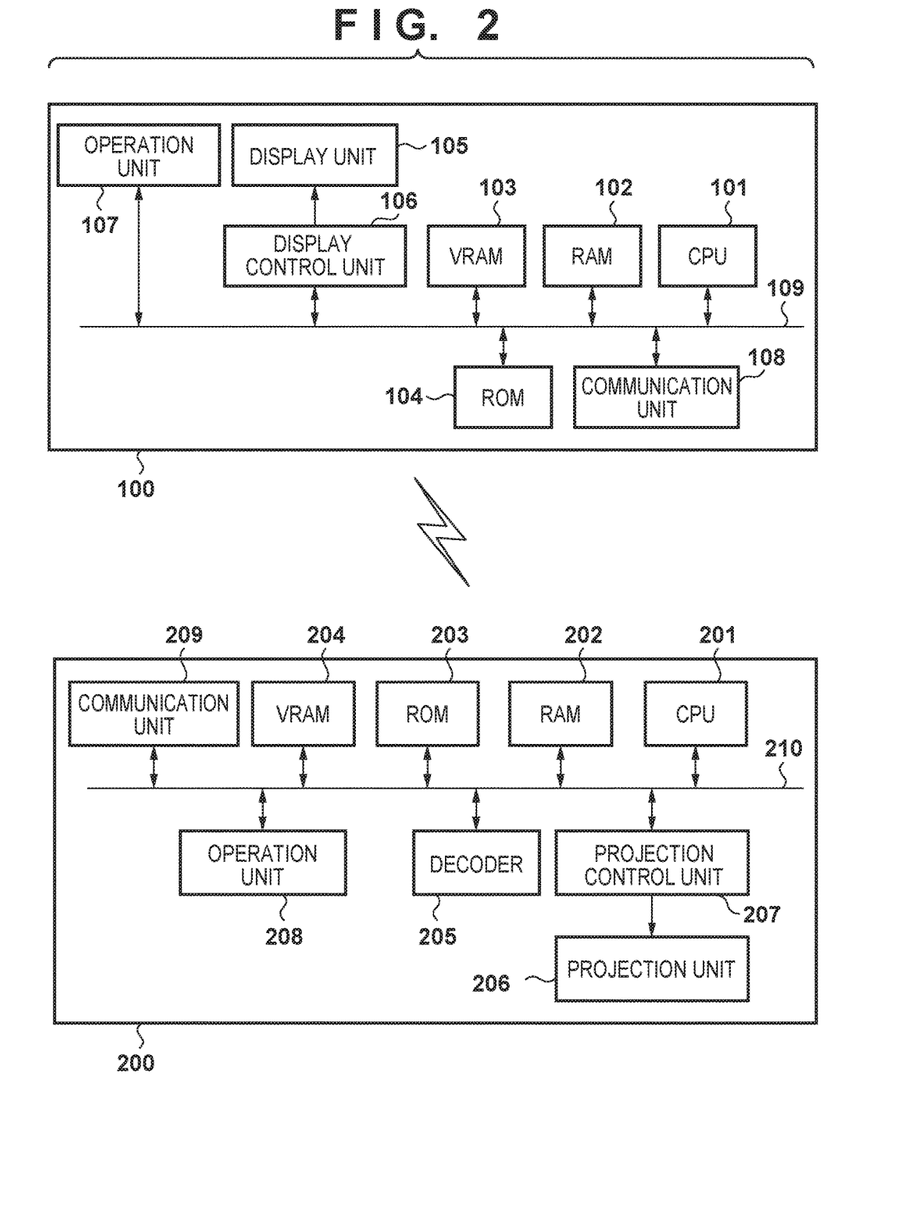
FIG. 2 is a block diagram illustrating a configuration of an apparatus according to the embodiment.

As illustrated in FIG. 2, the smartphone 100 includes a CPU 101, a RAM 102, a VRAM 103, a ROM 104, a display unit 105, a display control unit 106, an operation unit 107, and a communication unit 108. It should be noted that the smartphone 100 may further include an image capturing unit that captures an image, and a recording medium that records a captured image.

The CPU 101 controls various functional blocks of the smartphone 100. The RAM 102 is a main memory that stores data. The RAM 102 is primarily used as a region for storing various types of data, such as a region where programs that are executed by the CPU 101 are stored or expanded or a work region used while a program is being executed.

The VRAM 103 is used as a region for storing images to be displayed in the display unit 105, which will be described later. It should be noted that if the data transfer speed of the RAM 102 is sufficiently fast, the VRAM 103 may be the same as the RAM 102.

The ROM 104 is used for storing various types of programs and data such as a boot program, application programs (a screen transfer application, a Web browser application, and the like that are described in the present embodiment), and an OS.

The display unit 105 displays an image based upon a control signal from the display control unit 106, which will be described later. The display unit 105 is a liquid crystal panel, or an organic EL panel, for example.

The display control unit 106 performs control such that image data stored in the VRAM 103 is read out and displayed in the display unit 105.

The operation unit 107 includes switches, buttons, and a touch panel provided in the display unit 105, for example, and the operation unit 107 accepts an operation instruction from a user and sends out a control signal to the CPU 101. The CPU 101 receives the control signal input on the operation unit 107 and controls functional blocks of the smartphone 100.

In the smartphone 100, the touch panel is integrally constructed with the LCD (liquid crystal display) panel and then capable of detecting a touch operation on the display unit 105. Input coordinates on the touch panel and display coordinates on the display unit 105 are correlated. As a result, a GUI can be constructed that makes it possible for the user to directly manipulate the screen displayed on the display unit 105. The CPU 101 is capable of detecting the following operations performed by contacting the touch panel: touching of the panel using a finger or pen (referred to as "touch-down" below); a state in which the touch panel is in contact with a finger or pen (referred to as "touch-on" below); movement of a finger or pen while in contact with the touch panel (referred to as "move" below); lifting of a finger or pen that has been in contact with the touch panel (referred to as "touch-up" below); and a state in which the touch panel is not being touched at all (referred to as "touch-off" below). These operations and position coordinates at which the touch panel is being touched by the finger or pen are communicated to the CPU 101 through an internal bus 109 and, based upon the information thus communicated, the CPU 101 determines what kind of operation was performed on the touch panel. As for "move", the determination can be made also for every vertical component and horizontal component with regard to the direction of movement of the finger or pen, which is moved on the touch panel, based upon a change in the coordinate position. Further, it is assumed that a stroke has been made when a "touch-up" is performed following a regular "move" after a "touch-down" on the touch panel. A very quick stroke operation is referred to as a "flick". A "flick" is an operation in which, with fingers in contact with the touch panel, the fingers are moved rapidly over a certain distance and then lifted. In other words, this is a rapid tracing operation in which the fingers are flicked across the surface of the touch panel. The CPU 101 can determine that a "flick" has been performed when it detects such movement over a predetermined distance or greater and at a predetermined speed or greater and then detects a "touch-up". Further, the CPU 101 can determine that "drag" has been performed if it detects movement over a predetermined distance or greater at a speed less than a predetermined speed.

The communication unit 108 has a function of transmitting and receiving a control signal, a video signal, and the like to/from an external apparatus such as the projector 200; there is no particular limitation on the communication method, and wireless LAN, wired LAN, USB, Bluetooth (registered trademark), or the like can be used as the communication method, for example. Here, the external apparatus can be any apparatus such as a personal computer, a camera, a mobile phone, a smartphone, a hard disc recorder, a game machine, or the like, as long as the external apparatus can communicate with the smartphone 100. In the case of communication over a wireless LAN, the communication unit 108 includes an antenna, a RF unit, a baseband unit, and the like, and is capable of transmitting and receiving packets conforming to the wireless LAN standard that the communication unit 108 supports.

The internal bus 109 connects the above-described functional blocks to each other so as to enable data communication, and functions as a transmission path for sending out various types of data, control information, and the like to the functional blocks of the smartphone 100.

As illustrated in FIG. 2, the projector 200 includes a CPU 201, a RAM 202, a ROM 203, VRAM 204, a decoder 205, a projection unit 206, a projection control unit 207, an operation unit 208, and a communication unit 209. It should be noted that the projector 200 further may include an image capturing unit that captures video projected by the projection unit 206, which will be described later, and a recording medium that records the captured video.

The CPU 201 controls various functional blocks of the projector 200. The RAM 202 is a main memory that stores data. The RAM 202 is mainly used as a region for storing various types of data, such as a region where programs that are executed by the CPU 201 are stored gar expanded or a work region used while a program is being executed.

The ROM 203 is used for storing data advance, such as a control program and parameters for operating the projector 200.

The VRAM 204 is used as a region for storing age data that is projected by the projection unit 206, which will be described later.

In the case where image data received from the smartphone 100 is a file encoded in a format such as JPEG, the decoder 205 decodes the file.

The projection unit 206 displays video based upon the control signal from the projection control unit 207, which will be described later. Specifically, the projection unit 206 includes a liquid crystal panel, a lens, and a light source that are not shown.

The projection control unit 207 performs control such that, image data stored in the VRAM 204 is read out and the image data is projected by the projection unit 206.

The operation unit 208 includes switches and a touch panel that are provided in the housing, a remote control receiving unit that accepts an operation instruction of the user from a remote controller (not shown), and the like, and the operation unit 208 accepts an operation instruction from the user and sends out the control signal to the CPU 201.

The communication unit 209 has a function of transmitting and receiving a control signal, a video signal, and the like to/from an external apparatus such as the smartphone 100; there is no particular limitation on the communication method, and wireless LAN, wired LAN, USB, Bluetooth (registered trademark), or the like can be used as the communication method, for example. Here, the external apparatus may be a personal computer, a camera, a mobile phone, a smartphone, a hard disk recorder, a game machine, a remote controller, and the like as long as the external apparatus is capable of communicating with the projector 200. In the case of communication over a wireless LAN, the communication unit 209 includes an antenna, a RF unit, a baseband unit, and the like, and is capable of transmitting and receiving packets conforming to the wireless LAN standard that the communication unit 209 supports.

An internal bus 210 connects the above-described functional blocks to each other so as to enable data communication, and functions as a transmission path for sending out various types of data, control information, and the like to the functional blocks of the projector 200.

Description of System Operations

Next, operations performed by the system according to the present embodiment will be described with reference to FIGS. 3A to 6C.

It should be noted that the present embodiment describes a case in which an operation for scrolling a screen, which is as described in FIGS. 3A to 3D, is performed, and a case in which an operation for enlarging or reducing screen display, which is as described in FIGS. 4A to 4E, is performed as the operation for changing the display appearance of an image to be displayed in the smartphone 100.

Description of Basic Operation

Figure 5A:
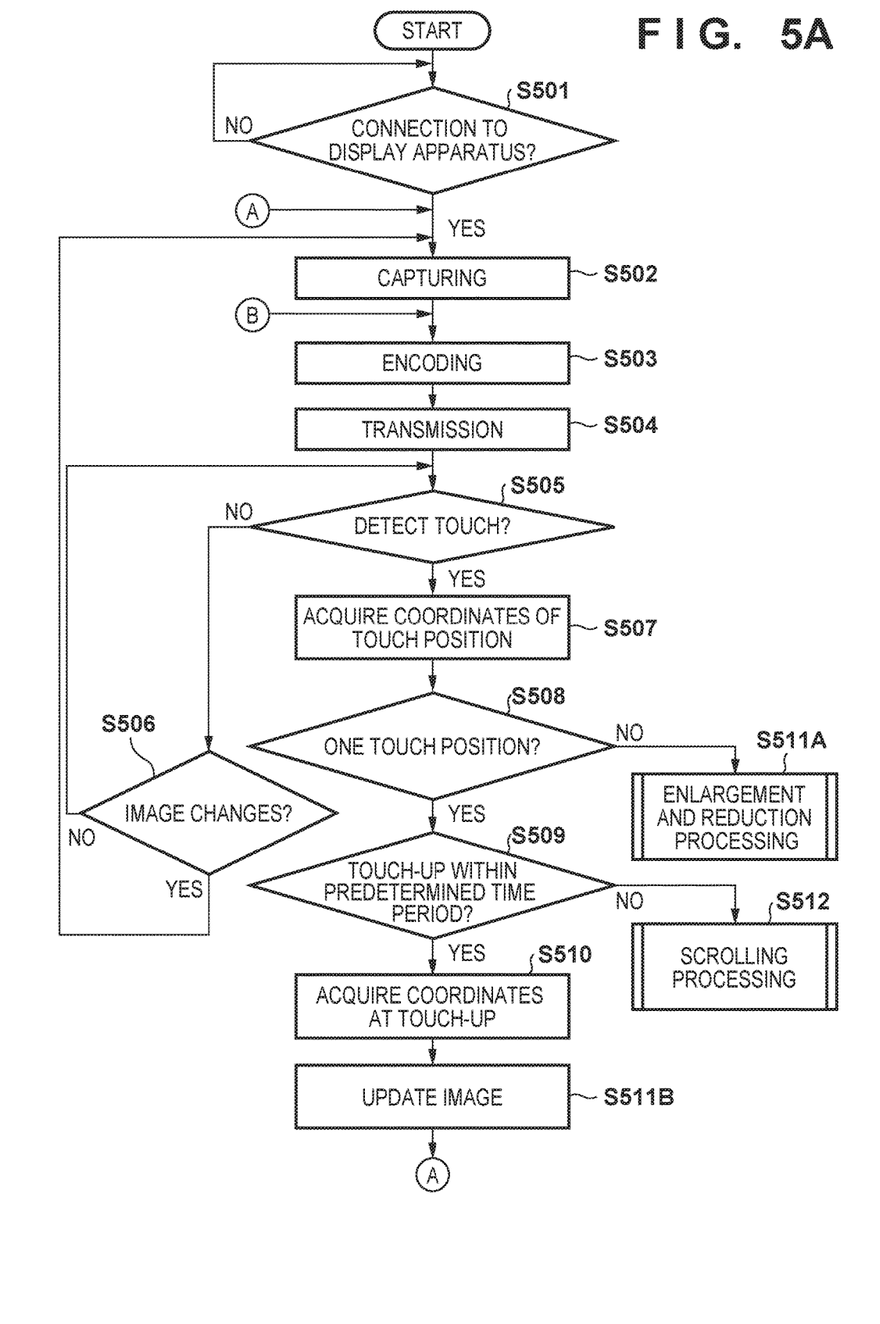
FIGS. 5A to 5C are flowcharts illustrating scrolling processing in an information processing apparatus according to the embodiment.

First, the basic operation of the smartphone 100 will be described with reference to FIG. 5A. It should be noted that the processing illustrated in FIG. 5A is realized by the CPU 101 expanding the program stored in the ROM 104 into the work region of the RAM 102 and controlling the functional blocks. Also, the processing in FIG. 5A is started by the user starts up a screen transfer application on the smartphone 100 using the operation unit 107. The same applies in FIGS. 5B and 5C, which will be described later.

When the screen transfer application is started up, in step S501, the CPU 101 controls the communication unit 108 in accordance with the operation instruction from the user and determines whether the smartphone 100 is connected to the projector 200. If the result of the determination indicates that the smartphone 100 is not connected to the projector 200, the CPU 101 waits for a connection to the projector 200 in step S501, whereas if it is determined that the smartphone 100 is connected to the projector, the processing advances to step S502. By the CPU 201 controlling the communication unit 209, the projector 200 waits for a connection request, and if the projector 200 accepts the connection request, the projector 200 communicates this request to the smartphone 100. If a connection is established through the above-described communication, the communication unit 108 of the smartphone 100 notifies of the CPU 101 of an event. If the connection is not established, the processing of step S501 is repeated. It should be noted that the projector 200 that is a connection target is determined by the user inputting the IP address of the projector 200.

In step S502, the CPU 101 controls the display control unit 106 and transfers image data that is being displayed in the display unit 105 from the VRAM 103 to the RAM 102. It should be noted that in the present invention, "capture" refers to processing for storing data rendered in the VRAM 103 in the RAM 102.

In step S503, the CPU 101 performs processing for encoding the image data stored in the RAM 102 through the capturing, using a screen transfer application program. Here, the encoding format used in JPEG, which is generally used for compressing image data, for example. It should be noted that the compression method is not limited to JPEG, and may be any method as long as the image data can be decoded by the projector 200, which will be described later.

In step S504, the CPU 101 transmits an encoded image file to the projector 200 via the communication unit 108.

The CPU 101 determines in step S505 whether a touch-down performed on the screen via the operation unit 107 has been detected; if a touch-down is not detected, the processing advances to step S506, whereas if a touch-down is detected, the processing advances to step S507.

In step S506, the CPU 101 determines whether the image data stored in the VRAM 103 is the same as the image data captured in step S502. If the result of the determination indicates that there is a change in the image data, the processing returns to step S502 to again execute capturing of the screen and encoding and transmitting of image data, whereas if there is no change, the processing returns to step S505 to again monitor whether a touch-down is performed by the user.

In step S507, the CPU 101 acquires position coordinates where the user touches the touch panel via the operation unit 107.

In step S508, the CPU 101 determines whether there is one touch position, and if there is one touch position, the processing advances to step S509, whereas if there is not one touch position, the processing advances to step S511A.

In step S511A, the CPU 101 performs enlargement and reduction processing, which will be described later.

In step S509, the CPU 101 monitors whether a touch-on is performed on the screen via the operation unit 107, and determines whether a touch-up is detected within a predetermined time period (for example, approximately 0.5 seconds). If the result of the determination indicates that a touch-up is detected within a predetermined time period, the processing advances to step S510, whereas if a touch-up is not detected, the processing advances to step S512.

In step S510, the CPU 101 determines that the flick operation has been performed, and acquires position coordinates at a point in time when a touch-up is detected on the screen.

In step S511B, the CPU 101 updates the screen, and the processing returns to step S502. It should be noted that the processing for updating the screen in step S511B is processing for updating the screen to a screen corresponding to the flick operation. In the screen updating processing based upon the flick operation, the direction in which the flick operation is performed is determined using the position coordinates acquired in steps S507 and S510, and processing for sending images, processing for sending pages, and the like are performed, for example, to update the screen.

In step S512, the CPU 101 performs scrolling processing, which will be described later.

Figure 6A:
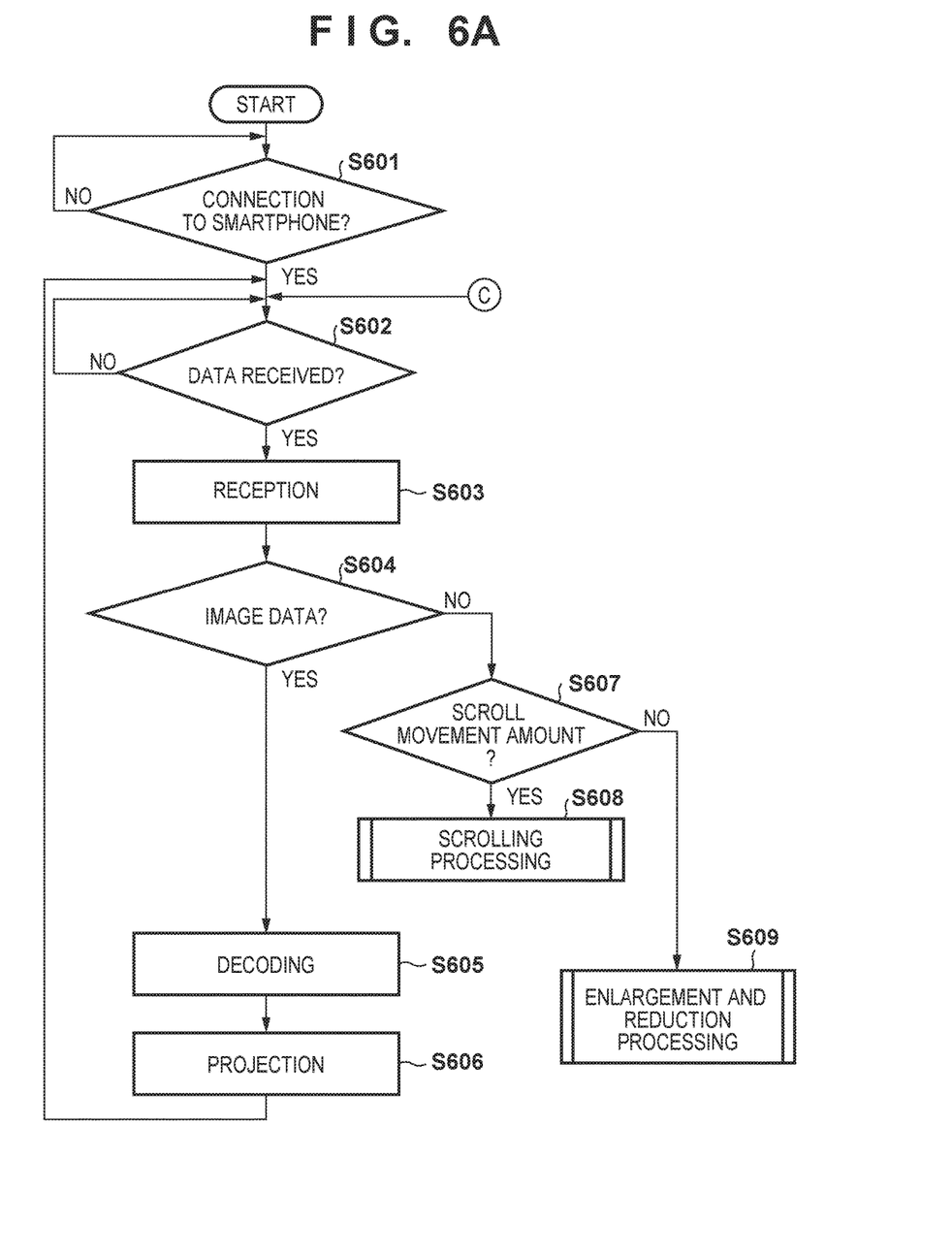
FIGS. 6A to 6C are flowcharts illustrating enlargement and reduction processing in a display control apparatus according to the embodiment.

Next, the basic operation of the projector 200 will be described with reference to FIG. 6A. It should be noted that the processing illustrated in FIG. 6A is realized by the CPU 201 expanding the program stored in the ROM 203 into the work region of the RAM 202 and controlling the functional blocks. Also, the processing illustrated in FIG. 6A is started when the user turns on the power source of the projector 200 using the operation unit 208, The same applies in FIGS. 6B and 6C, which will be described later.

The CPU 201 waits for a connection from the smartphone 100 in step S601, and if the smartphone 100 is connected to the projector 200, the processing advances to step S602.

The CPU 201 controls the communication unit 209 and waits for reception of data from the smartphone 100 in step S602, and then if the communication unit 209 receives the image data transmitted from the smartphone 100 to the projector 200, the processing advances to step S603.

In step S603, the CPU 201 stores the image data received from the smartphone 100 in the RAM 202.

The CPU 201 determines in step S604 whether the data received from the smartphone 100 is image data, and if the data is image data, the processing advances to step S605, whereas if the data is not image data, the processing advances to step S607.

In step S605, the CPU 201 controls the decoder 205, performs decoding processing on the encoded image data that is stored in the RAM 202, and stores the decoded image data in the VRAM 204. It should be noted that scaling processing may be carried out after the decoding processing to change the image size to a desired display size.

In step S606, the CPU 201 controls the projection control unit 207 so that the image data stored in the VRAM 204 is read out, after which the image data is projected and displayed by the projection unit 206.

The CPU 201 determines in step S607 whether the data received from the smartphone 100 indicates a scroll movement amount, and if the data is the scroll movement amount, the CPU 201 performs the scrolling processing (step S608), which will be described later, whereas if the data is not the scroll movement amount and is an enlargement ratio or a reduction ratio, the CPU 201 performs enlargement and reduction processing (step S609), which will be described later.

The CPU 201 repeats the above-described reception, decoding, projection control processing, scrolling processing, and enlargement and reduction processing every time data is received from the smartphone 100 until an instruction for ending the screen transfer program or an instruction for turning off the power source of the projector 200 is given by the user.

Description of Scroll Operation

Next, a scroll operation will be described with reference to FIGS. 3A to 3D, 5B, and 6D.

Figure 3A:
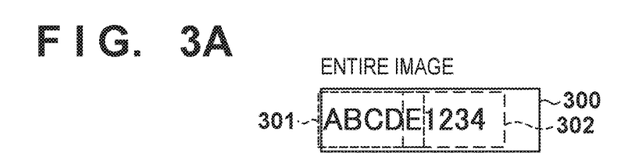
FIGS. 3A to 3D are diagrams illustrating a scroll operation in the embodiment.

Hereinafter, a state in which the user is scrolling and browsing an overall image 300 as illustrated in FIG. 3A using the smartphone 100 will be described as an example. A region displayed on the screen of the smartphone 100 when scrolling starts is a region having a rectangular shape 301 indicated by a dotted line illustrated in FIG. 3A. A region displayed on the screen of the smartphone 100 when scrolling ends is a region having a rectangular shape 302 indicated by a broken line illustrated in FIG. 3A.

Figure 3B:
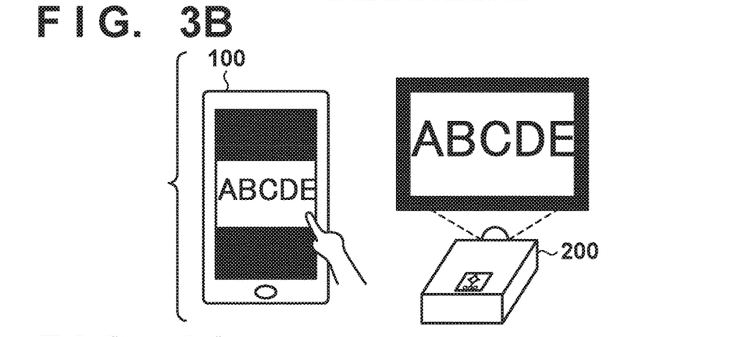
Figure 3C:
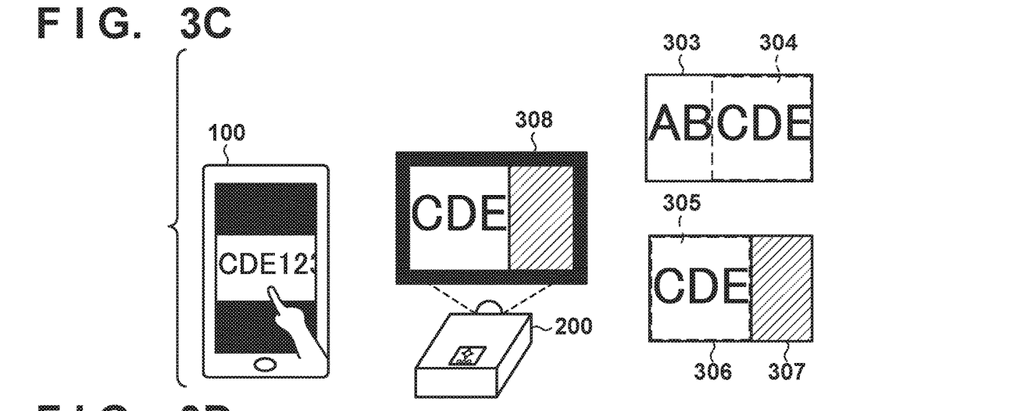
Figure 3D:
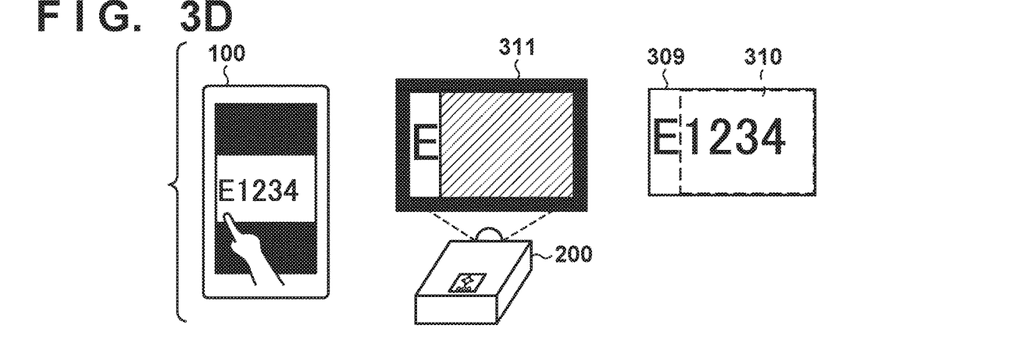

FIG. 3 illustrates the screens of the smartphone 100 and the projector 200 when scrolling starts (FIG. 3B), during scrolling (FIG. 3C), and when scrolling ends (FIG. 3D).

Figure 5B:
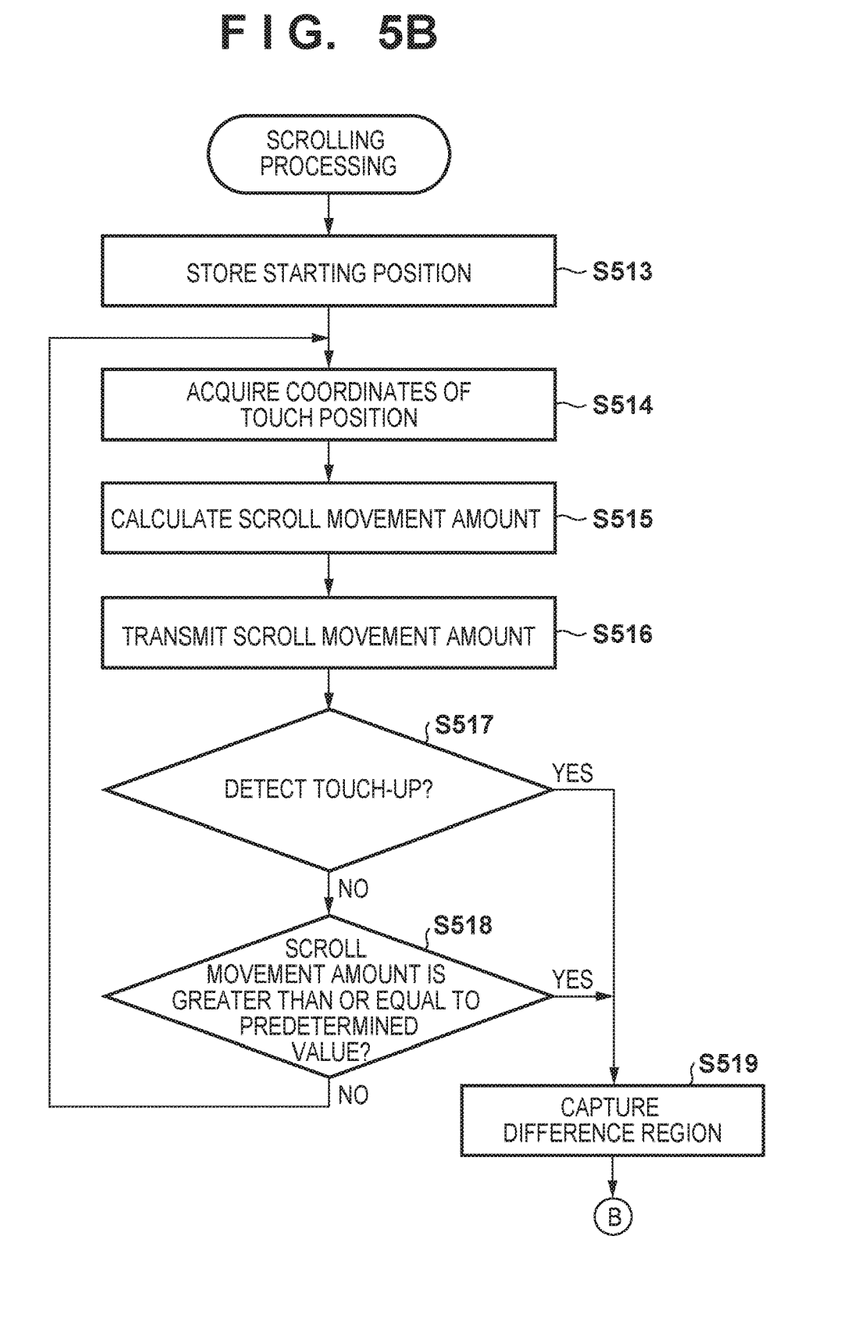

First, scrolling processing in the smartphone 100 in step S512 of FIG. 5A will be described with reference to FIG. 5B.

When a scroll operation is started, in step S513, the CPU 101 stores the position coordinates acquired in step S507 in the RAM 102 as a touch-on starting position. Here, the touch-on starting position represents position coordinates where the user operating the smartphone 100 touches the screen in FIG. 3B.

In step S514, the CPU 101 acquires position coordinates where the user touches the screen via the operation unit 107.

In step S515, the CPU 101 calculates the scroll movement amount using the position coordinates acquired in steps S513 and S514 and transmits the calculated amount to the projector 200 via the communication unit 108 in step S516.

The CPU 101 determines in step S517 whether the user continues to perform the touch-on on the screen via the operation unit 107, and if the touch-on is continued, the processing advances to step S518, whereas if a touch-up is detected, the processing advances to step S519.

The CPU 101 determines in step S518 whether a scroll movement amount is greater than or equal to a predetermined value, and if the scroll movement amount is greater than or equal to the predetermined value, the processing advances to step S519, whereas if the scroll movement amount is less than the predetermined value, the processing returns to step S514, and the CPU 101 continues the scrolling processing. It should be noted that a configuration is possible in which if the scroll movement amount is less than the predetermined value in step S518, the processing returns to step S502 without transmitting the scroll movement amount, and the captured image data is transmitted again. Also, a configuration is possible in which if a range where image data is cut out exceeds a range of the captured image data because the scroll movement amount is large or if the range is less than a predetermined proportion relative to the projection screen, the processing returns to step S502, and the captured image data is transmitted again.

As a result of determining whether the scroll movement amount is greater than or equal to the predetermined value in this manner, it is possible to avoid a situation in which, in the scrolling processing performed in the projector 200 that will be described later, an image to be projected is lost or a region that can be projected is reduced to an extreme degree.

In step S519, the CPU 101 calculates a difference region using the starting position acquired in the step S513 and the current scroll movement amount and then captures the difference region.

Here, processing for capturing the difference region in step S519 will be described with reference to FIG. 3D.

When scrolling ends, which is illustrated in FIG. 3D, a region having a rectangular shape 309 is displayed on the smartphone 100, Meanwhile, an image 311 is projected by the projector 200. In order to update the hatched region of the image 311 projected by the projector 200 in such a state, it is necessary to transmit image data of a rectangular region 310 surrounded by a broken line from the smartphone 100 to the projector 200. The rectangular region 310 can be calculated easily using the starting position stored in step S513 and the coordinates from when scrolling ends.

The CPU 101 calculates the rectangular region 310 using the starting position acquired in step S513 and the current scroll movement amount in step S519 to perform capturing processing, the processing returns to step S503, and the CPU 101 performs encoding processing. As a result of performing processing for capturing the difference region in this manner, it is possible to reduce the load of processing involved in the capturing, encoding, and transmission executed by the smartphone 100. Also, it is possible to reduce the load of processing involved in the reception, decoding, and projection executed by the projector 200. Accordingly, it is possible to synchronize the image projected by the projector 200 and the screen displayed on the smartphone 100 after scrolling ends in a shorter amount of time.

The above-described scrolling processing enables transmission of only the scroll movement amount from the smartphone 100 to the projector 200 from FIG. 3B to FIG. 3D.

Figure 6B:
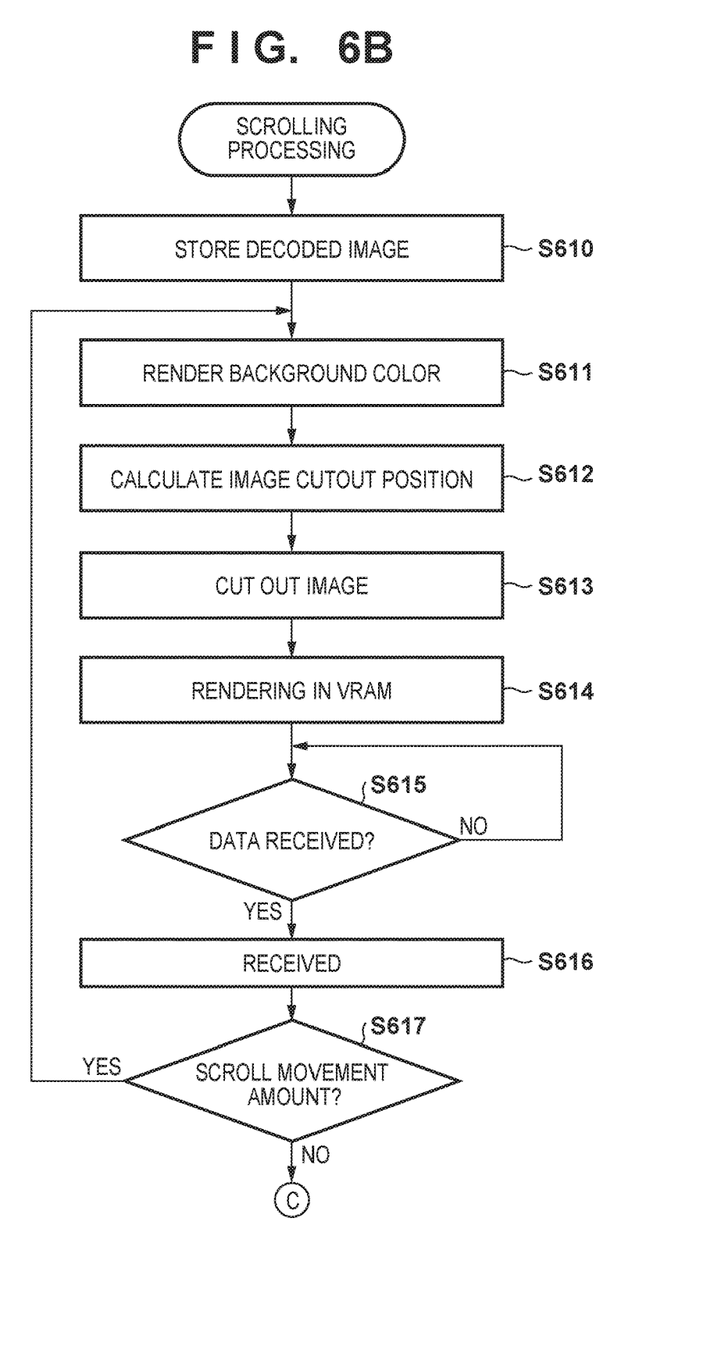

Next, scrolling processing in the projector 200 in step S608 illustrated in FIG. 6A will be described with reference to FIG. 6B. As can be seen from the image illustrated in FIG. 5A and displayed on the screen of the smartphone 100, the smartphone 100 is in a state in which the processing from steps S502 to S504 has been executed at least once before a touch-down is detected in step S505, Accordingly, the scrolling processing will be started in the projector 200 in a state in which the processing from steps S603 to S606 has been executed at least once. In other words, the projector 200 is in a state in which the processing of step S605 has been executed at least once before the scrolling processing is executed in step S608, and thus the scrolling processing of step S608 is started in a state in which the decoded image data is stored in the VRAM 204.

When the scrolling processing is started, in step S610, the CPU 201 stores the image data decoded in step S605 in the RAM 202. Although the present embodiment has described the decoded image data as being stored in the RAM 202, it should be noted that a configuration is possible in which the VRAM 204 holds the decoded image data if the VRAM 204 has a sufficient storage region.

In step S611, the CPU 201 fills the storage region of the VRAM 204 with a predetermined background color. Although a background color is mentioned here, the storage region may be filled with a specific pattern instead of the background color.

In step S612, the CPU 201 calculates cutout position for the image using the scroll movement amount received in step S603.

In step S613, the CPU 201 cuts out an image using the image data stored in the RAM 202 in step S610.

In step S614, the CPU 201 renders the cutout image data in the VRAM 204.

Here, the processing from steps S612 to S614 will be described with reference to FIG. 3C. Reference numeral 303 indicates image data stored in the RAM 202, and a rectangle 304 surrounded by a broken line indicates an image region cut out in step S613. Meanwhile, reference numeral 305 indicates image data rendered in the VRAM 204. A rectangle 306 surrounded by a broken line indicates image data rendered in the VRAM 204 in step S614, Also, a hatched region 307 indicates the storage region filled in step S611.

As a result of processing of steps S610 to S614, a projection image 308 is projected by the projector 200.

The CPU 201 monitors the communication unit 209, waits for arrival of data in step S615, and receives the data via the communication unit 209 (step S616).

The CPU 201 determines in step S617 whether the data received in step S616 is a scroll movement amount, and if the data is the scroll movement amount, this processing ends, whereas if the data is not the scroll movement amount, the processing returns to step S611, and the CPU 201 continues the scrolling processing.

According to the scrolling processing in the present embodiment, the amount of communication can be reduced by transmitting only the scroll movement amount from the smartphone 100 to the projector 200 in the scrolling processing. Also, by updating the screen in the projector 200 based upon the scroll movement amount, it possible to update the screen projected by the projector 200 in a shorter amount of time than in normal screen transfer processing. Therefore, the user who watches the screen projected by the projector 200 can immediately recognize an operation performed in the smartphone 100, and thus an effect in which the user can easily understand the direction in which the screen is scrolled can be achieved.

Furthermore, in the scrolling processing (step S610) in the projector 200, the data of the projected image is temporarily stored in the RAM 202, and, thus the image can be updated by transmitting only the scroll movement amount even in the case where the user has moved the screen using a scroll operation and the screen has returned to the original position.

Although the present embodiment has described that the scroll movement amount is transmitted immediately at a point in time when scrolling starts in the smartphone 100, a configuration is possible in which a wider region is transmitted in advance when scrolling starts. Specifically, rather than transmitting only the rectangular region 301 indicated in FIG. 3A, the entire image 300, or the rectangular region 302, may be transmitted in advance when the scrolling starts in FIG. 3B. By transmitting the data on a slightly wider image when scrolling starts in this manner, it is possible to prevent the region that is hatched and filled with the background color illustrated in FIGS. 3C and 3D from being displayed. Also, such a configuration enables scrolling across a wider range.

Furthermore, although the present embodiment has described that the processing of steps S611 to S614 is performed when a scroll movement amount is received again in step S617 in the scrolling processing in the projector 200, a previous scroll movement amount and the current scroll movement amount are compared to generate an intermediate image in accordance with the difference between the stated scroll movements. In other words, a configuration is possible in which in the case where a difference between the previous scroll movement amount and the current scroll movement amount is greater than a predetermined value, the projector 200 temporarily projects an image corresponding to the intermediate scroll movement amount. By generating such an intermediate image, it is possible to achieve an effect in which a user viewing the screen projected by the projector 200 can easily recognize the scrolling direction even in the case where quick scrolling processing is performed in the smartphone 100.

Description of Enlargement and Reduction (Zooming) Operation

Next, enlargement and reduction operation will be described with reference to FIGS. 4A to 4E, 5C, and 6C.

Figure 4A:
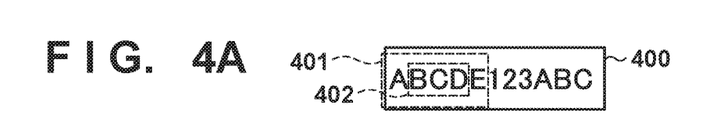
FIGS. 4A to 4E are diagrams illustrating enlargement and reduction operations in the embodiment.
Figure 4B:
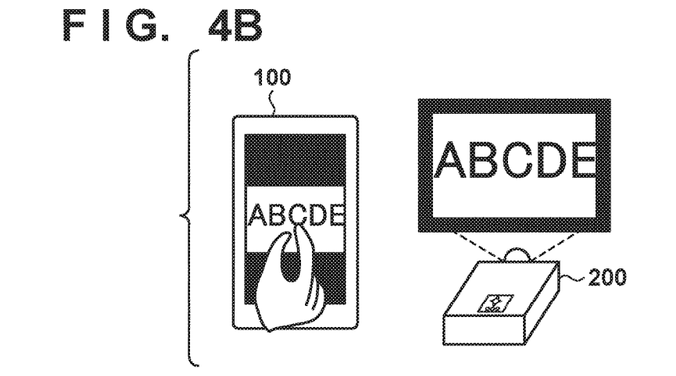
Figure 4C:
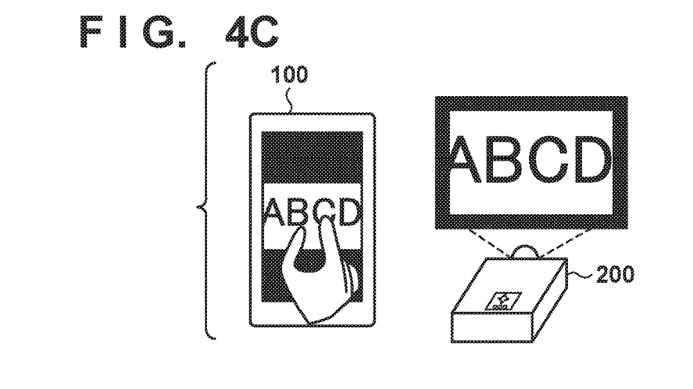
Figure 4D:
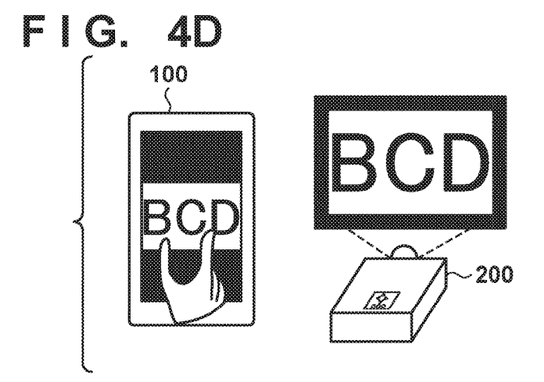

Hereinafter, an example will be described in which in the entire image 400 illustrated in FIG. 4A, a rectangle 402 indicated by a broken line is enlarged and displayed from a state in which a rectangle 401 indicated by a dotted line is displayed. FIGS. 4B, 4C, and 4D respectively illustrate screens of the smartphone 100 and the projector 200 when enlargement starts, during enlargement, and when enlargement ends.

First, scrolling processing in the smartphone 100 in step S512 of FIG. 5A will be described with reference to FIG. 5B.

Figure 4E:
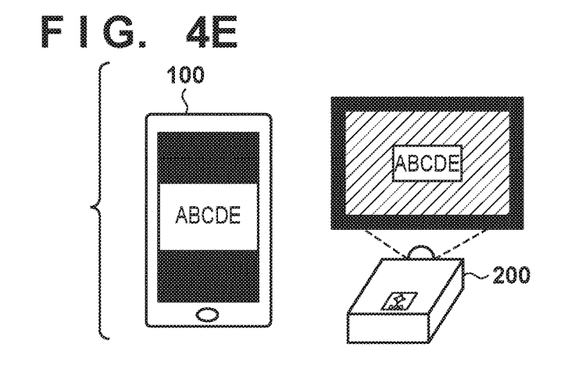

Although transitions in the enlargement processing illustrated in FIGS. 4B to 4D will be described hereinafter, it should be noted that the same applies to the reduction processing, an example of which is illustrated in FIG. 4E.

Figure 5C:
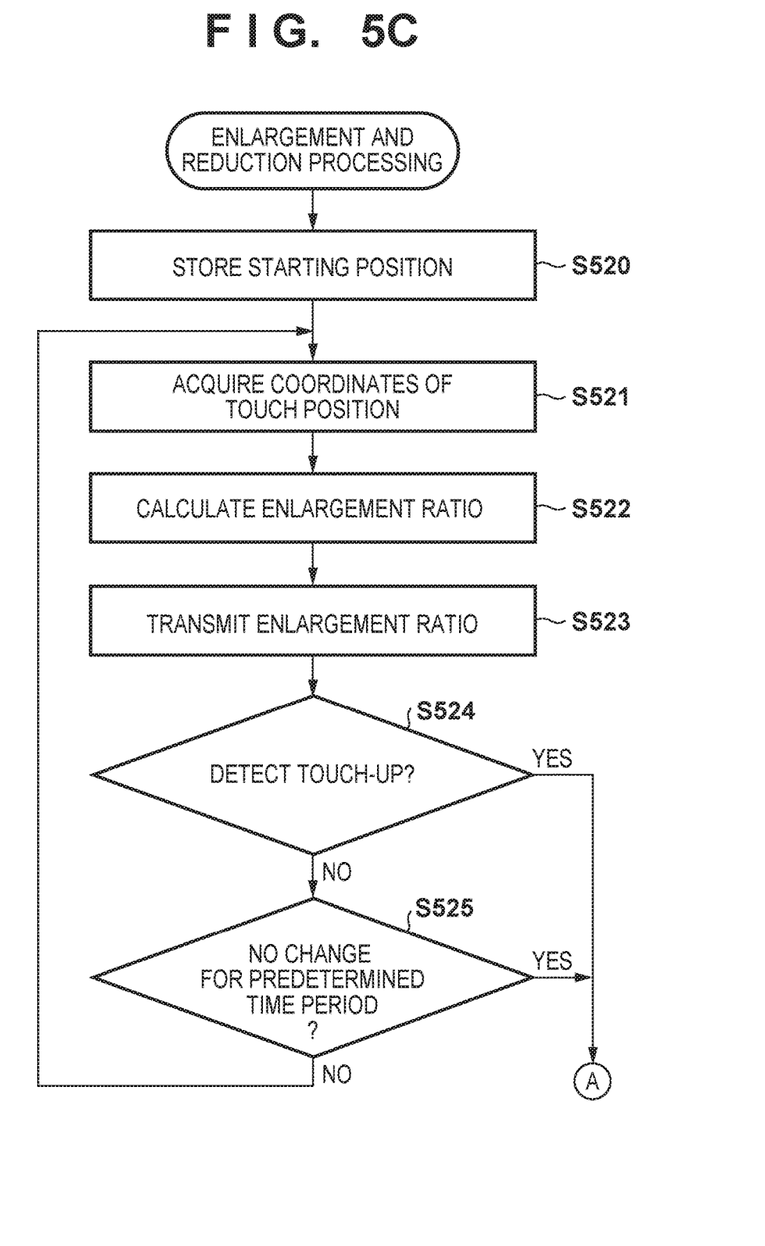

First, the enlargement and reduction processing in the smartphone 100 in step S511A of FIG. 5A will be described with reference to FIG. 5C.

When an enlargement operation is started, in step S520, the CPU 101 stores two position coordinates acquired in step S507 in the RAM 102 as starting positions of touch-on. Here, in FIG. 4B, the starting positions of touch-on represent two position coordinates where the user operating the smartphone 100 touches the screen using two fingers.

In step S521, the CPU 101 acquires two position coordinates via the operation unit 107.

In step S522, the CPU 101 calculates an enlargement ratio using a ratio of the distance between two touch positions acquired in step S520 and the distance between two touch positions acquired in step S521, and in step S523, the CPU 101 transmits the calculated enlargement ratio to the projector 200 via the communication unit 108.

The CPU 101 determines in step S524 whether the user continues to perform the touch-on on the screen via the operation unit 107, and if he or she continues to perform the touch-on, the processing advances to step S525, whereas if a touch-up is detected, the processing returns to step S502.

The CPU 101 determines in step S525 whether the position coordinates have not changed for a predetermined time period or greater, and if the position coordinates have not changed, the processing returns to step S502, whereas if the position coordinates have changed, the processing returns to step S521, and the CPU 101 continues the enlargement processing.

In this manner, by ending the enlargement and reduction processing in the case where the position coordinates have not changed for the predetermined time period or greater in step S525, it is possible to update the image projected by the projector 200 to an image captured by the smartphone 100 (steps S502 to S504). In the present embodiment, enlargement or reduction is performed on the image data that the projector 200 received from the smartphone 100, but the image quality will deteriorate if the enlargement processing is performed in the projector 200. Also, if the reduction processing is performed in the projector 200, a region where an image cannot be displayed will be formed around the image as in FIG. 4E. If the user operating the smartphone 100 ends the enlargement or reduction partway through and does not lift his or her fingers, such a deteriorated image or the image that has a non-display region in the periphery of the screen will continue to be projected by the projector 200. In order to avoid such a situation, it is determined in step S525 whether the touch position has changed. By determining whether the touch position has changed in this manner, the image projected by the projector 200 can be more appropriately displayed.

Although the condition for ending the processing is that the touch positions have not changed for the predetermined time period or greater in step S525, it should be noted that a configuration is possible in which as long as the enlargement processing is performed within a predetermined enlargement ratio, the processing returns to step S502 without transmitting the enlargement ratio and the captured image data is transmitted. In other words, a configuration is possible in which if the enlargement processing performed by the user is slow, the processing returns to step S502, and capturing, encoding, and transmission are performed.

As a result of the above-described enlargement processing, only the enlargement ratio is transmitted from the smartphone 100 to the projector 200 from FIG. 4B to FIG. 4D.

Next, scrolling processing (step S608) in the projector 200 in step S608 of FIG. 6A will be described with reference to FIG. 6B.

The above-described processing from steps S520 to S525 is the enlargement and reduction processing in the smartphone 100. As a result of the above-described enlargement and reduction processing, only an enlargement ratio or reduction ratio is transmitted from the smartphone 100 to the projector 200 from FIG. 4B to FIG. 4D.

Figure 6C:
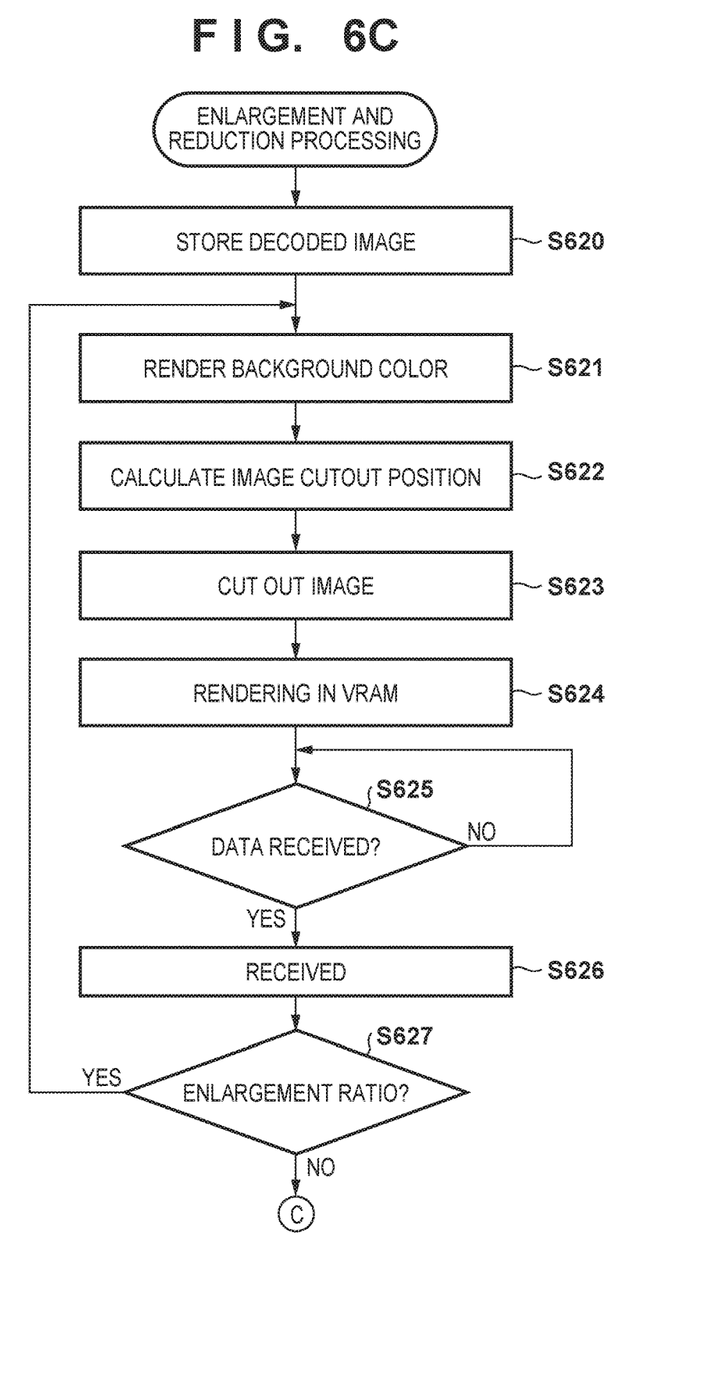

Next, the enlargement and reduction processing in the projector 200 in step S609 of FIG. 6A will be described with reference to FIG. 6C.

Although the transitions in the enlargement processing illustrated in FIGS. 4B to 4D will be described hereinafter, it should be noted that the same applies to the reduction processing. Also, similarly to the above-described scrolling processing, before the enlargement and reduction processing is executed, the enlargement and reduction processing in step S609 is started in a state in which the decoded image data is stored in the VRAM 204.

When the enlargement and reduction processing is started, in step S620, the CPU 201 stores the image data decoded in step S605 in the RAM 202. Although the present embodiment has described the decoded image data as being stored in the RAM 202, it should be noted that a configuration is possible in which the VRAM 204 holds the decoded image data if the VRAM 204 has a sufficient storage region.

In step S621, the CPU 201 fills the storage region of the VRAM 204 with a predetermined background color. Although a background color is mentioned here, the storage region may be filled with a specific pattern instead of the background color.

In step S622, the CPU 201 calculates a cutout position for the image is cut out using the enlargement ratio received in step S603.

In step S623, the CPU 201 cuts out an image using the image data stored in the RAM 202 in step S620.

In step S624, the CPU 201 renders the image data on which the enlargement processing was performed in the VRAM 204.

In step S625, the CPU 201 monitors the communication unit 209, waits for arrival of data, and receives the data via the communication unit 209 (step S626).

The CPU 201 determines in step S627 whether the data received in step S626 is the enlargement ratio, and if the data is the enlargement ratio, the CPU 201 ends this processing, whereas if the data is not the enlargement ratio, the processing returns to step S621, and the CPU 201 continues the enlargement and reduction processing.

According to the enlargement and reduction processing of the present embodiment, the amount of communication can be reduced by transmitting only the enlargement ratio or reduction ratio from the smartphone 100 to the projector 200 in the enlargement and reduction processing. Also, by updating the screen in the projector 200 based upon the enlargement ratio or reduction ratio, it is possible to update the screen projected by the projector 200 in a shorter amount of time than in normal screen transfer processing. Therefore, the user who watches the screen projected by the projector 200 can immediately recognize an operation performed in the smartphone 100, and thus an effect in which the user can easily understand enlargement or reduction of the screen can be achieved.

It should be noted that the present invention is not limited to scrolling operations and enlargement and reduction operations, and can be applied in any operations that can change a display appearance of an image to be displayed on the smartphone 100. In this case, it is sufficient that the smartphone 100 transmits information of the amount of change in the display appearance of the image to be changed by an operation to the projector 200, and the projector 200 cuts out an image using image data based upon the information received from the smartphone 100, and updates the projected screen.

OTHER EMBODIMENTS

An embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of the above-described embodiment and/or controlling the one or more circuits to perform the functions of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or, Blu-ray Disc (BD)™), flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-128463, filed Jun. 23, 2014 which is hereby incorporated by reference herein in its entirety.

What is claimed is:

1. An information processing apparatus that transmits image data to be displayed in a display unit to a display control apparatus, the information processing apparatus comprising:
at least one processor;
a communication interface;
wherein the at least one processor functions as a transmission control unit and a detection unit, wherein
the transmission control unit performs control such that the image data to be displayed is transmitted to the display control apparatus via the communication interface; and
the detection unit detects an operation performed on the information processing apparatus,
wherein in a case where the detection unit detects a predetermined operation for changing a display appearance of the image data to be displayed, the transmission control unit performs control such that information of an amount of change resulting from the predetermined operation is transmitted before transmission of the image data to be displayed, to the display control apparatus via the communication interface, and
wherein the information of the amount of change which the display control apparatus uses to process the image data to be displayed that is received from the information processing apparatus.

2. The apparatus according to claim 1, wherein the predetermined operation includes an operation for scrolling the image data to be displayed, and the transmission control unit performs control such that an amount of movement resulting from the scrolling operation is transmitted as the information of the amount of change.

3. The apparatus according to claim 1, wherein the predetermined operation includes an operation for enlarging or reducing the image data to be displayed, and the transmission control unit performs control such that an enlargement ratio or a reduction ratio resulting from the operation for enlargement or reduction is transmitted as the information of the amount of change.

4. The apparatus according to claim 1, wherein in a case where the amount of change is greater than a predetermined value, the transmission control unit performs control such that new image data to be displayed is transmitted.

5. The apparatus according to claim 4, wherein in a case where the new image data to be displayed is transmitted, the transmission control unit performs control such that a difference between image data that has been transmitted to the display control apparatus and image data that is being displayed is transmitted.

6. The apparatus according to claim 1, wherein in a case where the predetermined operation has not been performed for a predetermined time period, the transmission control unit performs control such that new image data to be displayed is transmitted.

7. The apparatus according to claim 1, wherein the detection unit detects a touch operation performed on the display unit, and the predetermined operation includes an operation of moving a finger while the finger is touching the display unit.

8. The apparatus according to claim 1, wherein the detection unit detects a touch operation performed on the display unit, and the predetermined operation includes an operation of moving a plurality of fingers while the fingers are touching the display unit.

9. The apparatus according to claim 1, wherein the information processing apparatus is a mobile phone.

10. The apparatus according to claim 1, wherein the information processing apparatus is a tablet terminal.

11. The apparatus according to claim 1, wherein the display control apparatus is a projector.

12. The apparatus according to claim 1, wherein in a case where the detection unit detects the predetermined operation, the transmission control unit performs control such that the information of the amount of change is transmitted to the display control apparatus before the image data to be displayed is newly transmitted,
the information of the amount of change is used to process the image data to be displayed which the display control apparatus has already received in a case where the display control apparatus received the information of the amount of change from the information processing apparatus.

13. A control method of an information processing apparatus that transmits image data to be displayed in a display unit to a display control apparatus, the control method comprising:
performing control such that the image data to be displayed is transmitted to the display control apparatus via a communication interface; and
detecting an operation performed on the information processing apparatus, wherein in a case where a predetermined operation for changing a display appearance of the image data to be displayed is detected in the detection step, control is performed such that information of an amount of change resulting from the predetermined operation is transmitted before transmission of the image data to be displayed, to the display control apparatus via the communication interface, and
wherein the information of the mount of change is information which the display control apparatus uses to process the image data to be displayed that is received from the information processing apparatus.

14. A non-transitory computer-readable storage medium storing a program for causing a computer to execute a control method, of an information processing apparatus that transmits image data to be displayed in a display unit to a display control apparatus, the control method comprising:
performing control such that the image data to be displayed is transmitted to the display control apparatus via a communication interface; and
detecting an operation performed on the information processing apparatus, wherein in a case where a predetermined operation for changing a display appearance of the image data to be displayed is detected in the detection step, control is performed such that information of an amount of change resulting from the predetermined operation is transmitted before transmission of the image data to be displayed, to the display control apparatus via the communication interface, and
wherein the information of the amount of change is information which the display control apparatus use to process the image data to be displayed that is received from the information processing apparatus.

15. A system including a display control apparatus and an information processing apparatus that transmits image data to be displayed in a display unit to the display control apparatus,
wherein the information processing apparatus comprising:
at least one processor;
a communication interface;
wherein the at least one processor functions as a transmission control unit and a detection unit, wherein
the transmission control unit performs control such that the image data to be displayed is transmitted to the display control apparatus via the communication interface; and
the detection unit detects an operation performed on the information processing apparatus,
wherein in a case where the detection unit detects a predetermined operation for changing a display appearance of the image data to be displayed, the transmission control unit performs control such that information of an amount of change resulting from the predetermined operation is transmitted before transmission of the image data to be displayed, to the display control apparatus via the communication interface,
wherein the display control apparatus processes the image data to be displayed that is received from the information processing apparatus based on the information of the amount of change.

* * * * *